Nov. 19, 1935.   R. L. JONES   2,021,510
PROPELLING DEVICE
Filed Jan. 22, 1934
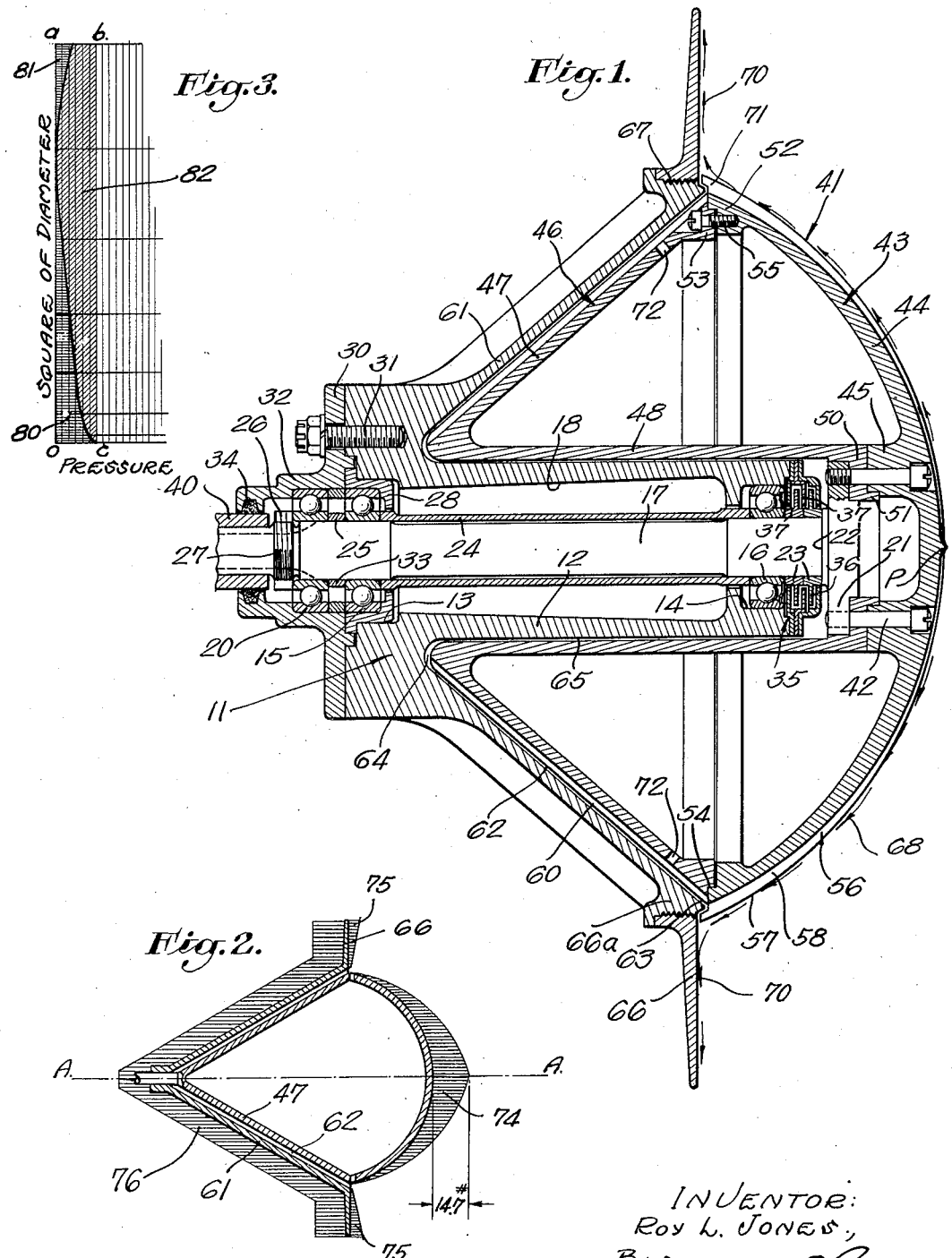

Patented Nov. 19, 1935

2,021,510

UNITED STATES PATENT OFFICE 2,021,510

PROPELLING DEVICE

Roy L. Jones, Glendale, Calif.

Application January 22, 1934, Serial No. 707,719

18 Claims. (Cl. 170—156)

My present device relates to a propelling means of a character which may be employed on various types of vehicles and is deemed to have especial utility on airplanes.

It is an object of my invention to provide a propelling device which derives a motivating force from the change in pressure in a fluid resulting from the change in velocity of the fluid within prescribed zones or areas.

It is an object of my invention to provide a device of the above character employing a rotary member which is preferably a figure of generation. This rotary member has a forward portion which is convex and preferably defines a portion of a sphere. The rearward portion of the rotary member is preferably in the form of a cone having the base thereof abutting the base of the forward portion on a plane which is perpendicular to the axis of rotation of the rotary member.

A particular feature of the invention is the provision of a thrust plate of conical form confronting the conical rearward portion of the rotary member and on the rearward face thereof receives the propelling thrust of fluid constituting the principal propelling element in the operation of my device.

Further objects and advantages of the invention will be made evident throughout the following part of the specification.

Referring to the drawing, which is for illustrative purposes only,

Fig. 1 is a view of a preferred embodiment of my invention sectioned on a vertical axial plane.

Fig. 2 is a schematic view showing the pressures or forces involved in the operation of the device Fig. 3 is a chart or graph of the pressures.

In the preferred embodiment of my invention I employ a supporting member 11 consisting preferably of a tubular wall 12 having a counterbore 13 in the rearward end thereof and a counterbore 14 in the forward end thereof respectively receiving bearing members 15 and 16 for supporting a shaft 17 which extends through the axial opening 18 of the member 11. The bearing members 15 and 16 are preferably of the roller type employing steel balls as the rolling elements thereof, and the bearing means 15 may be supplemented by additional bearing means 20 in the manner shown. The outer end of the shaft 17 is provided with a flange 21 having a rearwardly facing shoulder 22 against which a pair of rings 23 rest. Leftwardly adjacent the rings 23 is the bearing means 16 which is held at a desired distance of separation from the bearing means 15 by use of a sleeve 24. Between the bearing means 15 and 20 a spacer sleeve or ring 25 is employed, and the entire assembly of parts 23, 16, 24, 15, 25, and 20 is held upon the shaft 17 by means of a ring nut 26 held on a threaded portion 27 of the shaft 17 provided therefor. The bearing means 15 is held in the counterbore 13 by use of an annular casing member 28 which is held in place by an end plate 30 adapted to be secured to the rearward end of the supporting member 11 by screw means such as shown at 31. The bearing means 20 is held within the hub portion 32 of the cover plate 30 and is spaced from the bearing means 28 by use of a spacer ring 33, and the hub may be provided with a grease seal 34 of customary usage. For resisting the flow of fluid through the opening 18 of the member 11 and through the bearing means 15, 16, and 20, I provide a sealing means 35 comprising annular walls or webs 36 extending outwardly from the rings 23 and inwardly projecting walls or webs 37 which are secured upon the rightward or forward end of the supporting member 11, the walls 37 extending across the radial faces of the walls 36 in the manner shown so as to provide a tortuous passage for resisting a flow of fluid along the surface of the shaft 17. In the practice of the invention means are provided for rotating the shaft 17 at relatively high speed, and representative of such means I show a member 40 connected to the leftward end of the shaft 17, such member 40 being a part of a power mechanism, such as an engine or motor.

Mounted on the forward end of the shaft 17 is a rotary member 41 which may be secured to the flange 21 by means of screws 42. The rotary member 41 is preferably a figure of generation around the axis of the shaft 17 and is dynamically and statically balanced so that it will be substantially vibrationless when rotated at high speed. The rotary member 41 has a front portion which faces forwardly and a rear portion which faces rearwardly. In the prefered practice of my invention I employ a front portion 43 consisting essentially of a partly spherical or convex wall 44 having an axial hub or fitting 45 therein. Also, in the preferred practice of the invention I employ a rear portion 46 comprising a conical wall 47 which extends outwardly and forwardly from a cooperating tubular or cylindrical wall 48, the forward end of which is provided with an inwardly projecting flange 50 to fit against the flange 21 of the shaft 17. The flange 50 is provided with an axial lip 51 for centralizing the front portion 43, and the rightward face of the flange 50 is adapted to receive the hub 45, the screws 42 passing through the hub 45 and the flange 59 into threaded engagement with the flange 21 as shown. The conical wall 47 is so placed that it defines a cone having its base presented in forward or rightward direction so as to abut the base of the geometric solid defined by the convex wall 44. The peripheral portion 52 of the front section or portion 44 of the rotary member is joined with the peripheral portion 53 of the conical wall portion 47 by some suitable means such as a shouldered interengagement 54 and screws 55.

The forward or outer face of the front portion 43 is provided with rib-and-groove means 56 consisting of substantially radial ribs 57 with channels or grooves 58 therebetween, for engaging the fluid, such as air, in which the device is operating and causing the engaging fluid to travel at the velocity of the ribs 57 when the rotary member 41 is in rotation. The outer surface of the conical wall 47 may have rib-and-groove means 60 formed thereon, but under present consideration this is not of great importance. Confronting the conical wall 47, and consequently the rearward face of the rotary member 41, I provide a thrust plate 61 which may be readily formed integral with the rearward end of the supporting member 11 and which is preferably conical in form so that it will completely enclose the conical wall 47 and form between such wall and itself a conical space 62, the outer end 63 of which lies at the periphery of the rotary member 41 and the inner end 64 of which connects with the thin cylindrical space 65 between the wall 12 of the member 11 and the wall 48 of the rear portion 46. Secured to the peripheral portion 66a of the thrust plate 61 is an annular wall 66 of greater diameter than the rotary member 41 and having the function of receiving the flow of fluid produced by rotation of the rotary member 41. The wall 66 is secured on the thrust plate 61 by threaded engagement means 67 to facilitate removal of the wall member 66 should it be desired to replace the same with a wall member which slopes rearwardly instead of being essentially radial as is the wall member 66.

The operation of the device is as follows. The driving means is caused to rotate the rotary member 41 at high velocity. The fluid, such as air, engaged by the fins or ribs 57 is caused to travel at the same speed as the rotary member 41. Due to centrifugal forces, the air flows outwardly and rearwardly or leftwardly across the front face of the rotary member, as indicated by arrows 68, and this flow of air is received by the front face of the wall 66, as indicated by arrows 70. Starting with a point P at the center of the rotary member 41, the velocity of the air on the surface of the convex wall 44 increases toward the periphery 71 of the wall 44, and as the velocity of the air increases, the pressure thereof decreases. Consequently, if a sufficiently high speed of rotation is maintained, a complete vacuum may be obtained in the periphery 71 of the rotary member 41. This low pressure condition, such as a partial vacuum or substantially complete vacuum, is transmitted to the conical space 62 between the conical wall 47 and the thrust plate 61, and through openings 72 in the conical wall 47 air may be exhausted from the interior of the rotary member 41 so that a bursting pressure will not exist therein when a low pressure condition is produced on certain parts of the exterior thereof.

Resultant of providing the sealing means 35 for resisting the flow of fluid along the surface of the shaft 17, I am enabled to maintain the condition of the vacuum.

In Fig. 2 I have shown the device schematically and have indicated the air pressure on the front face of the rotary member 41 and across the front face of the extending wall 66 by shaded portions 74 and 75. In the center of the front face of the rotary member 41 the pressure will be substantially atmospheric or fourteen and seven-tenths pounds per square inch, and, as previously stated, if a sufficiently high peripheral speed is obtained, the pressure will taper off to zero. The air leaving the periphery of the rotary member 41 is directed to the inner portion of the wall 66 at high velocity, and the velocity thereof decreases as the air moves toward the periphery of the plate 66. Accordingly, there will be an increase in pressure across the front face of the wall 66, as indicated by the shaded areas 75. As previously stated, a low pressure will exist in the space 62 between the rotary member and the thrust plate 61. As shown by a shaded area 76, atmospheric pressure will be exerted in forward direction against the rearward face of the thrust plate 61 and the rearward face of the wall 66. The shaded areas 74 and 75 being illustrative of the forces operating rearwardly or leftwardly against the device, and the shaded area 76 being proportionate to the forces acting forwardly against the device, it will be perceived that there will be a definite forward thrust owing to the fact that the forces acting rearwardly against the device have been in part removed by the reduction in pressure in the air produced as the result of causing it to travel at high velocity through rotation of the rotary member 41. As shown by the shaded area 74, there is a definite atmospheric or fluid pressure against the front of the rotary member 41, but there is no pressure, or a reduced pressure, existing at the back, or, in other words, across the outer face of the conical wall 47 owing to the fact that a low pressure condition has been produced in the space 62. Therefore, there will be a tendency for the rotary member 41 to move leftwardly or rearwardly so as to close the space 62, which movement will be resisted by the bearing means shown in Fig. 1, and at the same time the pressure indicated by the shaded area 76 will tend to force the thrust plate 61 forwardly.

An analysis of the forces present represented by the shaded areas 74, 75, and 76 must be considered as applied to a circular area in a plane perpendicular to the axis of rotation A—A of the device. Also, it must be remembered that this circular area consists of a plurality of concentric rings, each of which is of larger area than the preceding ring in accordance with the following formula for determining the area A of a ring, in which formula D equals the outside diameter of the ring, and $d$ indicates the diameter of the opening through the ring: $A = D^2 - d^2 \times .7854$, and the total pressure P against each annular area will be $A \times p$, or $(D^2 - d^2 \times .7854) \times p$, where $p$ equals the average fluid pressure against the face of the ring or annular area. In the last of the foregoing equations the expression $D^2 - d^2 \times .7854$ varies in accordance with the squares of the diameters D and $d$. Accordingly, in Fig. 3 I have, for the purpose of more nearly showing the true pressure conditions produced in the device, shown a chart or graph in which the ordinates are laid off in values of $D^2$ and the abscissæ are laid off in values of pressure per square inch. Accordingly, the shaded areas 80 and 81 of the graph will be proportionate to the total pressure acting leftwardly against the front of the rotary member 41 and the wall 66, and the rectangular area $oabc$ will be representative of the pressure against the rearward face of the thrust plate 61 and the wall 66. The total force operating in forward direction is then represented by the area 82 which is left when the area 80 is subtracted from the area of the rectangle $o\ a\ b\ c$. Since this area 82 is greater than one-half the area of the rectangle $o\ a\ b\ c$, there will be an average forward propelling force against my device of one-half atmospheric pressure, or substantially seven pounds per square inch, when the rotary member is rotated at a speed sufficient to produce substantially a complete vacuum at the periphery thereof.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion; a conical thrust plate confronting the outer face of said conical portion of said rotary member, there being a low pressure space between said thrust plate and said conical portion; and means for rotating said rotary member.

2. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion; a conical thrust plate confronting the outer face of said conical portion of said rotary member, there being a low pressure space between said thrust plate and said conical portion; means for rotating said rotary member; and means for sealing around said shaft to resist leakage through said shaft opening of said supporting member.

3. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion, there being substantially radial rib-and-groove means on said forward portion of said rotary member; a conical thrust plate confronting the outer face of said conical portion of said rotary member, there being a low pressure space between said thrust plate and said conical portion; and means for rotating said rotary member.

4. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion, there being substantially radial rib-and-groove means on said forward portion of said rotary member; a conical thrust plate confronting the outer face of said conical portion of said rotary member, there being a low pressure space between said thrust plate and said conical portion; means for rotating said rotary member; and means for sealing around said shaft to resist leakage through said shaft opening of said supporting member.

5. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion; a conical thrust plate confronting the outer face of said conical portion of said rotary member, there being a low pressure space between said thrust plate and said conical portion; means for rotating said rotary member; and an annular wall member on the periphery of said conical thrust plate and projecting substantially radially beyond the periphery of said rotary member for receiving the flow issuing from said rotary member.

6. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion, there being substantially radial rib-and-groove means on said forward portion of said rotary member; a conical thrust plate confronting the outer face of said conical portion of said rotary member, there being a low pressure space between said thrust plate and said conical portion; means for rotating said rotary member; and an annular wall member on the periphery of said conical thrust plate and projecting substantially radially beyond the periphery of said rotary member for receiving the flow issuing from said rotary member.

7. A propelling device of the character described, including: a supporting member having a shaft opening therethrough; a shaft extending through said shaft opening; a rotary member secured to the forward end of said shaft, said rotary member comprising a forward portion of spherical segment form and a rearward portion of conical form, the base of said forward portion abutting the base of said rearward portion, there being substantially radial shallow rib-and-groove means on said forward portion of said rotary member; a conical thrust plate confronting the outer face of said conical portion of said rotary member, there being a low pressure space between said thrust plate and said conical portion; means for rotating said rotary member; means for sealing around said shaft to resist leakage through said shaft opening of said supporting member; and an annular wall member on the periphery of said conical thrust plate and projecting substantially radially beyond the periphery of said rotary member for receiving the flow issuing from said rotary member.

8. A propelling device of the character described, including: a supporting member; a rotary member carried by said supporting member, said rotary member comprising a forward spherical segment portion and a rearward conical portion; means for rotating said rotary member at high speed; and a thrust plate confronting said conical rearward portion of said rotary member.

9. A propelling device of the character described, including: a rotary member comprising a hollow body having a front portion and a rear portion; means for driving said rotary member at high speed to cause a sub-atmospheric pressure to be produced toward the periphery thereof; and an annular thrust plate confronting said rear portion of said rotary member, there being a low pressure space formed between said thrust plate and said rear portion of said rotary member, and there being an opening in said hollow body for evacuating air from its interior.

10. A propelling device of the character described, including: a rotary member comprising a hollow body having a front portion and a rear portion, said front portion having rib-and-groove means on the forward face thereof for engagement with the air; means for driving said rotary member at high speed to cause a subatmospheric pressure to be produced toward the periphery thereof; and an annular thrust plate confronting said rear portion of said rotary member, there being a low pressure space formed between said thrust plate and said rear portion of said rotary member, and there being an opening in said hollow body for evacuating air from its interior.

11. A propelling device of the character described, including: a rotary member having a front portion and a rear portion; means for driving said rotary member at high speed to cause a sub-atmospheric pressure to be produced toward the periphery thereof; an annular thrust plate confronting said rear portion of said rotary member, there being a low pressure space formed between said thrust plate and said rear portion of said rotary member; and a radial annular wall on the periphery of said thrust plate, said wall being of larger diameter than said rotary member and receiving the flow of air therefrom.

12. A propelling device of the character described, including: a rotary member comprising a hollow body having a front portion and a rear portion, said front portion having rib-and-groove means on the forward face thereof for engagement with the air; means for driving said rotary member at high speed to cause a subatmospheric pressure to be produced toward the periphery thereof; an annular thrust plate confronting said rear portion of said rotary member, there being a low pressure space formed between said thrust plate and said rear portion of said rotary member, and there being an opening in said hollow body for evacuating air from its interior; and a radial annular wall on the periphery of said thrust plate, said wall being of larger diameter than said rotary member and receiving the flow of air therefrom.

13. A propelling device of the character described, including: a rotary member comprising a hollow body having a front portion and a rear portion, said front portion being of spherical segment form and having rib-and-groove means on the forward face thereof for engagement with the air; means for driving said rotary member at high speed to cause a sub-atmospheric pressure to be produced toward the periphery thereof; and an annular thrust plate confronting said rear portion of said rotary member, there being a low pressure space formed between said thrust plate and said rear portion of said rotary member, and there being an opening in said hollow body for evacuating air from its interior.

14. A propelling device of the character described, including: a rotary member comprising a hollow body having a front portion and a rearwardly projecting conical rear portion joined on a radial plane, said front portion having rib-and-groove means on the forward face thereof for engagement with the air; means for driving said rotary member at high speed to cause a sub-atmospheric pressure to be produced toward the periphery thereof; and a conical thrust plate confronting said rear portion of said rotary member, there being a conical low pressure space formed between said thrust plate and said rear portion of said rotary member, and there being an opening in said hollow body for evacuating air from its interior.

15. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion; a conical thrust plate confronting the outer face of said conical portion of said rotary member, there being a low pressure space between said thrust plate and said conical portion; means for rotating said rotary member; and baffle means for resisting the flow of fluid along the surface of said shaft.

16. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion, there being substantially radial rib-and-groove means on said forward portion of said rotary member; a conical thrust plate confronting the outer face of said conical portion of said rotary member, there being a low pressure space between said thrust plate and said conical portion; means for rotating said rotary member; and baffle means connected to said supporting member for resisting the flow of fluid through said shaft opening of said supporting member.

17. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion, there being substantially radial rib-and-groove means on said forward portion of said rotary member; a conical thrust plate confronting the outer face of said conical portion of said rotary member, there being a low pressure space between said thrust plate and said conical portion; means for rotating said rotary member; and walls on said supporting member providing a tortuous passage for resisting the flow of fluid along the surface of said shaft.

18. A propelling device of the character described, including: a supporting member having a shaft opening therethrough; a shaft extending through said shaft opening; a rotary member secured to the forward end of said shaft, said rotary member comprising a forward portion of convex form and a rearward portion of conical form, the base of said forward portion abutting the base of said rearward portion; a conical thrust plate confronting the outer face of said conical portion of said rotary member, there being a low pressure space between said thrust plate and said conical portion; means for rotating said rotary member; and means carried by said supporting member providing a tortuous passage for resisting the flow of fluid along the surface of said shaft.

ROY L. JONES.